Aug. 2, 1966　　　　　M. BRENNER　　　　　3,264,449
ELECTRICALLY HEATED HAND TOOL
Filed Dec. 3, 1962　　　　　　　　　　　　2 Sheets-Sheet 2
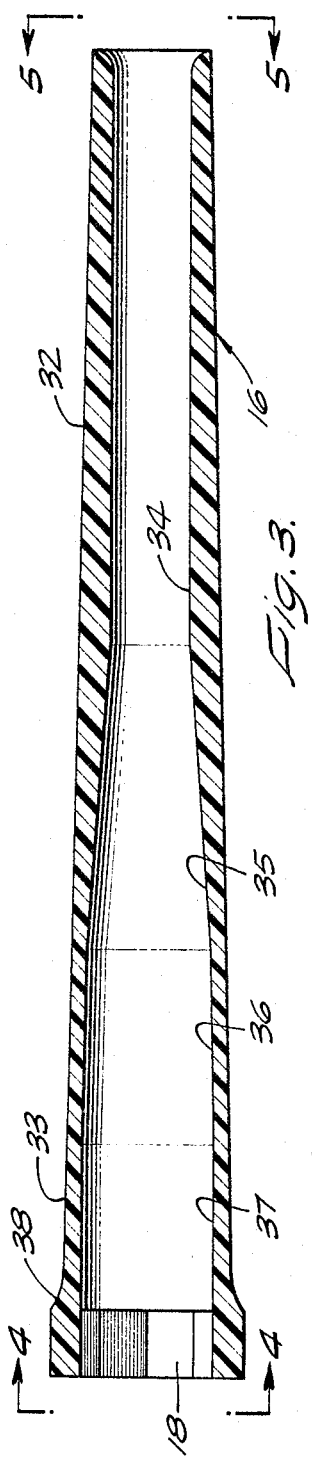
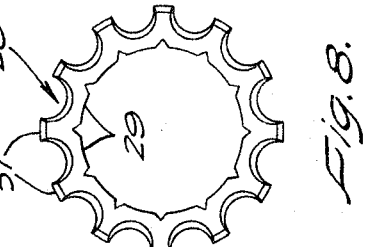
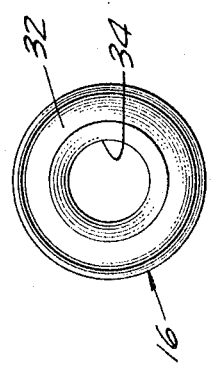
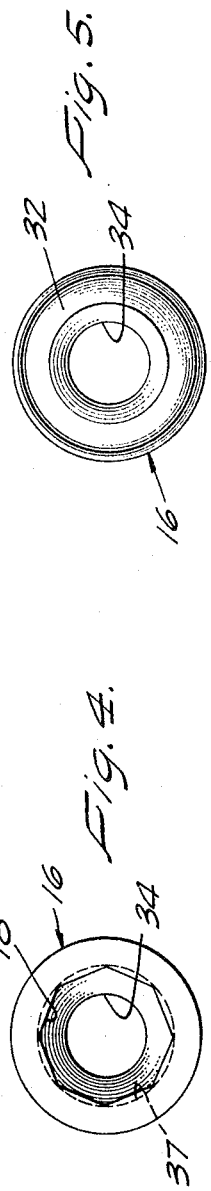
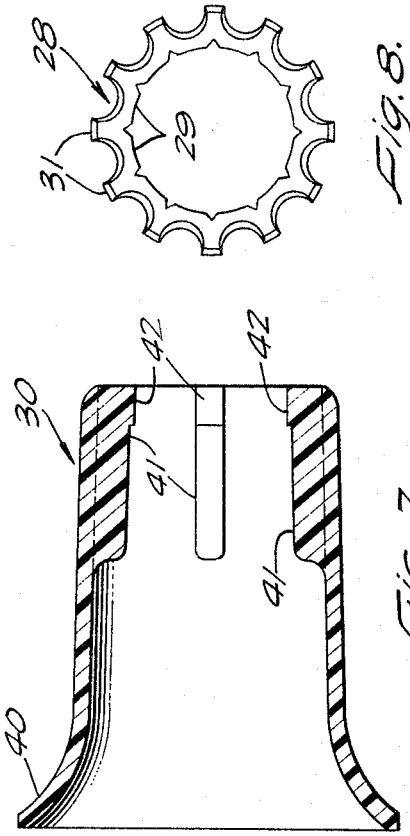
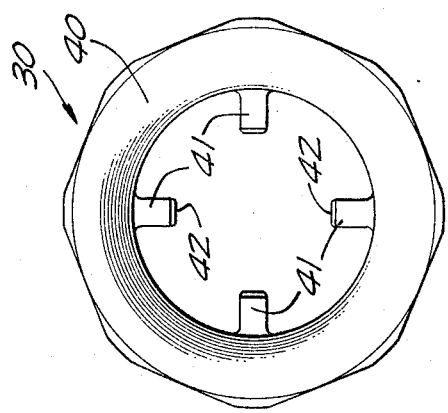
MORRIS BRENNER
INVENTOR.
KENDRICK AND STOLZY
BY
ATTORNEYS United States Patent Office
3,264,449
Patented August 2, 1966

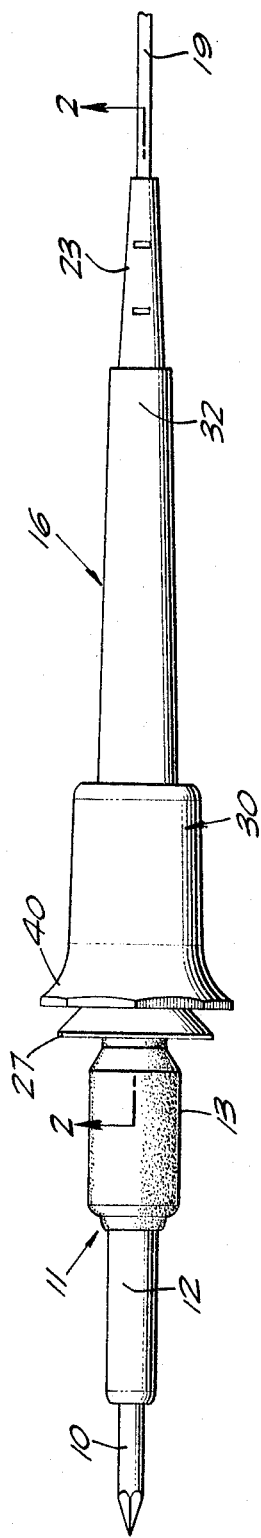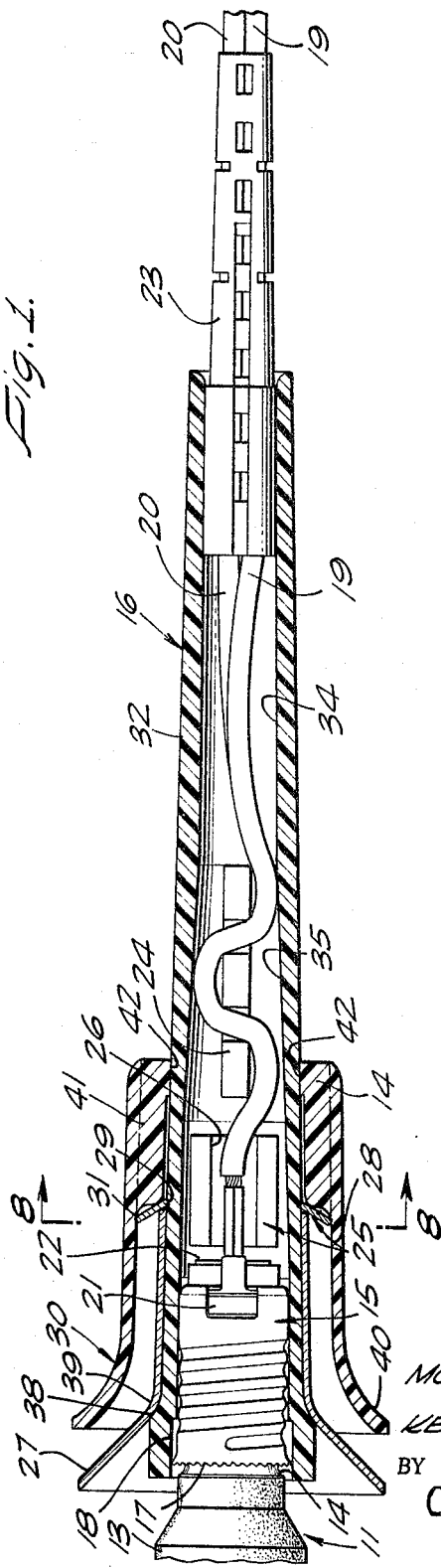

3,264,449
ELECTRICALLY HEATED HAND TOOL
Morris Brenner, 5106 Paseo de Pablso, Torrance, Calif.
Filed Dec. 3, 1962, Ser. No. 241,810
8 Claims. (Cl. 219—227)

This invention relates to portable electric heating apparatus, and more particularly, to a handle for a device having an electrically heated element which may be held and manually manipulated.

Although the device of the present invention may have a great many other applications and should therefore not be limited to those specifically set forth herein, it has been found to be especially useful to shield the hand of an operator from heat conducted and radiated from soldering iron having an electric heating element. The broad scope of application of the device of the present invention will be appreciated by the fact that it is immediately apparent that the invention can be employed with wood burning tools that are electrically heated and that may be used to burn decorative wood plaques and the like by hand.

In the past, it has been the practice to employ a soldering iron handle grip through which an air convection current may be circulated to cool the handle thereof, the convection current being created by the heat of the iron. Such a soldering iron is, for example, shown in U.S. Patent No. 2,997,684.

It has also been the practice in the prior art to employ a cork handle grip around a plastic handle having no provision for air to circulate. Some cooling in this case is achieved by the use of a metal heat reflector rather than by structure to establish an air convection current.

Both of the above-described soldering irons of the prior art have operated at handle grip temperatures very uncomfortable to the touch.

The device of the present invention overcomes the above-described and other disadvantages of the prior art by providing socket means having an end to receive a heating element, a metal shield fixed relative to and surrounding the socket means, the shield having a radially extending surface flared forwardly and outwardly of the socket means at the end thereof, a tube-like grip, and means holding the grip in a position fixed relative to and surrounding the shield in spaced relation thereto, the grip being made of an insulating material, the grip being open at both of its ends to allow a flow of air into the space between it and the shield at one end thereof and out of the space at the other end thereof.

By practicing the present invention, it was discovered that the combination of the shield and grip makes it possible to construct a soldering iron which will operate at a handle grip temperature 30° F. to 40° F. cooler than either one of those of the prior art described above. Moreover, the shield and grip, when employed together, reduce grip temperatures more than the sum of the reductions accomplished by the use of each independently. This may be accounted for because the shield acts as a heat sink, whereby the rate of heat transfer to the air convection current is increased.

According to a special feature of the present invention, the shield may have a relatively long length along a heating element socket. The relatively large area of the shield does not cause a substantial temperature gradient to exist along its length because of its high heat conductivity. This large area thus may account for a high rate of heat transfer to the moving air in the convection current.

Still another feature of the present invention lies in the construction of a soldering iron which may be assembled easily and quickly through the use of swaged or lock-type joints.

The above-described and other advantages of the present invention will be better understood from the following description when considered in connected with the accompanying drawings.

In the drawings which are to be regarded as merely illustrative:

FIG. 1 is a top plan view of a soldering iron made in accordance with the present invention;

FIG. 2 is a sectional view of the handle portion of the iron taken on the line 2—2 shown in FIG. 1;

FIG. 3 is a longitudinal sectional view of a tubular support shown in FIG. 2;

FIG. 4 is a front end elevational view of the support taken on the line 4—4 shown in FIG. 3;

FIG. 5 is a rear end elevational view of the support taken on the line 5—5 shown in FIG. 3;

FIG. 6 is a front end elevational view of a metal handle grip shown in FIG. 2;

FIG. 7 is a longitudinal sectional view of the handle grip shown in FIGS. 2 and 6; and FIG. 8 is a front end elevational view of a lock washer taken on the line 8—8 shown in FIG. 2.

In FIG. 1, an electrical soldering iron is shown including an iron plated copper tip 10 of a steel cartridge 11 which is provided with an elongated heating element housing 12 surrounded by a ceramic cylindrical body 13. Cartridge 11 is provided with a metal male plug at its right end 14 shown in FIG. 2 which is threaded into a female socket 15.

Socket 15 is surrounded by and swaged into a tubular support 16. Socket 15 is provided with a serrated edge 17 that bites into the walls of a hexagonal cavity 18 shown in both FIGS. 2 and 4.

The soldering iron shown in FIGS. 1 and 2 is provided with insulated electrical input leads 19 and 20, the conductors of which are connected to lugs 21 and 22 respectively, on socket 15. The insulation of leads 19 and 20 is bonded to a plastic grommet which is swaged into the right end of support 16. A spacer 24, made of an insulating material, is provided for the leads 19 and 20. Another spacer 25 is also provided for leads 19 and 20 and lugs 21 and 22, spacer 25 also being made of an insulating material.

Due to the fact that the entire construction of cartridge 11, socket 15, grommet 23, leads 19 and 20 and all the other structures shown inside support 16 are entirely conventional and due to the fact that any number of structures may be substituted for them and they do not, by themselves, form any part of the present invention, no further description of these structures is believed to be necessary and therefore is not given herein. Suffice it to say here that spacer 25 is provided with a groove 26 on opposite sides not only to receive the right end of lug 21, but also the right end of lug 22, not shown. If desired, grommet 23 may be provided with longitudinal grooves and the right end of support 16 may be provided internally with longitudinal ribs to mate with the grommet grooves to prevent the same from rotating about the longitudinal axis of support 16.

Support 16 is made of a plastic insulating material. A horn-shaped metal shield 27 is positioned around the outside of the left end of support 16 along the length of socket 15. A metal lock washer 28 holds shield 27 in the position shown in FIG. 2. Washer 28 has a sharp inner edge to bite into the external surface of support 16 at 29 and a sharp outer edge to bite into the internal surface of a grip 30 at a position 31 not only to hold itself stationary with respect to support 16, but also to hold grip 30 in a fixed position, that is, in the position shown in FIG. 2.

As shown in FIGS. 3 and 5, the external surface of support 16 at 32 is frusto-conical in shape, this surface having a diameter at the right end of support 16 as viewed in FIG. 3 smaller than that at a position indicated, for example, at 33 in FIG. 3. The taper may be uniform and of a magnitude the same as that illustrated in the drawings. Support 16 may have a bore at its right end 34 of a uniform diameter, tapering bores at 35 and 36 and a uniform bore at 37. All of the structures shown in the drawings may have proportionate sizes as illustrated. FIG. 1 may be considered a full scale drawing. Hence, some of the component parts shown in the other views are enlarged therefrom.

Note will be taken in FIG. 3 that support 16 is provided with a slight flare at 38 on its external surface to mate with a flare at 39 of shield 27 shown in FIG. 2.

Grip 30, shown in FIGS. 6 and 7, also has a flared end portion 40 which, as shown in FIG. 2, is approximately parallel to the flare of shield 27, but spaced therefrom. Grip 30 is provided with four longitudinal ribs 41, as shown in FIG. 6. Ribs 41 extend over an axial length smaller than the length of grip 30 from its right end as shown in FIG. 7. Ribs 41 are provided with surfaces 42 to be swaged onto the external surface of support 16.

From the foregoing, it will be appreciated that air may flow in between ribs 41 and between the external surface of support 16 and the internal surface of grip 30, and between shield 27 and grip 30 longitudinally of the grip 30 to cool shield 27. The flared end of shield 27 acts not only as a reflector, but it, with the remainder of the body portion thereof, acts as a heat sink.

By practicing the present invention, it may then be seen that the rate of heat transfer to the air convection current between shield 27 and grip 30 may be substantially increased over that of the prior art. Still further, due to the relatively long length of shield 27 and the area of its external surface, a substantial increase in the rate of heat transfer to the air convection current between grip 30 and shield 27 is also achieved.

Note will also be taken that the device of the present invention may be easily and quickly assembled in that shield 27 may be moved slidably over the right end of support 16 to the position shown in FIG. 2. The same is true of washer 28 and grip 30 in that order. Simply by pushing grip 30 over the right end of support 16 as viewed in FIG. 2 with washer 28 therein until they are positioned as shown in FIG. 2 is the only assembly step required for them. This same structure holds shield 27 in a fixed position relative to support 16. Shield 27 cannot come off of the left end of support 16 due to the match of the flare 38 on the support 16 and the flare 39 of shield 27.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. A handle for an electric heating device comprising: a tube-like support having a frusto-conical external surface of a small taper and having one end larger than the other, said support being made of an insulating material; socket means fixed inside said one end of said support, said socket means having an end at said one end of said support to receive a heating element; a metal shield fixed relative to said support surrounding said support at said one end thereof, said shield having a radially extending surface flared forwardly and outwardly of said socket means at said end thereof, said shield having a body portion extending along the length of said socket means around said support, said support being provided with a radial flare at said one end thereof to mate with that of said shield to prevent the latter from sliding off of said one support end; a tube-like grip having a plurality of longitudinal ribs extending radially therein at one end thereof, said grip also being made of an insulating material, said ribs being swaged onto said support to a position such that said grip surrounds said shield and is held in spaced parallel relation thereto, said grip also having a radially and forwardly extending flare at the other end thereof adjacent said flare of said shield positioned in approximately parallel spaced relation thereto; and a washer surrounding said support between the end of said shield opposite said flared end and said ribs, said washer having sharp projections extending in inward and outward directions radially therefrom to bite into said support and said grip, respectively, said outward projections and said ribs defining passageways therebetween to permit a continuous flow of air in one end of said grip and out the other end thereof between said grip and said shield.

2. In an electric heating device, the combination comprising: an elongated tube-like handle, the external surface of said handle being tapered from a smaller diameter at its rearward end to a larger diameter at its forward end, said handle being made of an insulation material; a heating element fixed with said handle at the forward end thereof; and a tube-like handle grip open at each of its ends, said grip also being made of an insulation material, said grip having inwardly extending projections swaged tightly onto said handle at the forward end thereof.

3. An electric heating device comprising: a hollow, elongated support made of an insulating material, said support having a projection at one end extending outwardly therefrom in a radial direction; a hollow, elongated metal heat sink slidable forwardly on said support to a position in engagement with said projection; means to limit axial movement of said heat sink rearwardly away from engagement with said projection; and a heating element carried by said support.

4. An electric heating device comprising: a hollow, elongated support made of an insulating material, said support having a projection at one end extending outwardly therefrom in a radial direction; a hollow, elongated metal heat sink slidable forwardly on said support to a position in engagement with said projection; means to limit axial movement of said heat sink rearwardly away from engagement with said projection; a heating element carried by said support; and a hollow elongated grip positioned around said support, said grip being made of an insulating material, said grip having a body surrounding said support in spaced relation thereto and having a plurality of more than two axial ribs fixed to and extending inwardly of said body, said ribs being swaged tightly upon said support, said ribs being disposed contiguous to the rearward end of said heat sink to limit axial movement thereof rearwardly away from engagement with said projection.

5. An electric heating device comprising: a hollow, elongated support made of an insulating material, said support having a projection at one end extending outwardly therefrom in a radial direction; a hollow, elongated metal heat sink slidable forwardly on said support to a position in engagement with said projection; means to limit axial movement of said heat sink rearwardly away from engagement with said projection; a heating element carried by said support; and a hollow elongated grip positioned around said support, said grip being made of an insulating material, said grip having a body surrounding said support in spaced relation thereto and having a plurality of more than two axial ribs fixed to and extending inwardly of said body, said ribs being swaged tightly upon said support, said ribs being disposed contiguous to the rearward end of said heat sink to limit axial movement thereof rearwardly away from engagement with said projection, said grip body also extending around said heat sink in a position wholly spaced therefrom.

6. An electric heating device comprising: a hollow, elongated support made of an insulating material, said support having a projection at one end extending outwardly therefrom in a radial direction; a hollow, elongated metal heat sink slidable forwardly on said support to a position in engagement with said projection; a heating element carried by said support; a hollow elongated grip positioned around said support, said grip being made of an insulating material, said grip having a body surrounding said support in spaced relation thereto and having a plurality of more than two axial ribs fixed to and extending inwardly of said body, said ribs being disposed contiguous to the rearward end of said heat sink to limit axial movement thereof rearwardly away from engagement with said projection; and a lock washer between the rearward end of said heat sink and said grip, said washer being a metal spider having sharp spaced teeth extending to the external surfaces of said support and to the internal surface of said grip body in a conical plane, said teeth being buried in said support external surface and said grip body internal surface, said grip being adapted to allow air to enter one end thereof and to allow the same said air to escape from the other end thereof after passing therethrough in the space between said grip and said support.

7. An electric heating device comprising: a hollow, elongated support made of an insulating material, said support having a projection at one end extending outwardly therefrom in a radial direction; a hollow, elongated metal heat sink slidable forwardly on said support to a position in engagement with said projection; means to limit axial movement of said heat sink rearwardly away from engagement with said projection; a heating element carried by said support; and a hollow elongated grip positioned around said support, said grip being made of an insulating material, said grip having a body surrounding said support in spaced relation thereto and having a plurality of more than two axial ribs fixed to and extending inwardly of said body, said ribs being swaged tightly upon said support, said ribs being disposed contiguous to the rearward end of said heat sink to limit axial movement thereof rearwardly away from engagement with said projection, the hollow character of said grip allowing air to enter one end thereof and allowing the same said air to escape from the other end thereof after passing therethrough in the space between said grip and said support.

8. An electric heating device comprising: a hollow, elongated support made of an insulating material, said support having a projection at one end extending outwardly therefrom in a radial direction; a hollow, elongated metal heat sink slidable forwardly on said support to a position in engagement with said projection; means to limit axial movement of said heat sink rearwardly away from engagement with said projection; a heating element carried by said support; and a hollow elongated grip positioned around said support, said grip being made of an insulating material, said grip having a body surrounding said support in spaced relation thereto and having a plurality of more than two axial ribs fixed to and extending inwardly of said body, said ribs being swaged tightly upon said support, said ribs being disposed contiguous to the rearward end of said heat sink to limit axial movement thereof rearwardly away from engagement with said projection, said grip body also extending around said heat sink in a position wholly spaced therefrom, the hollow character of said grip allowing air to enter one end thereof and allowing the same said air to escape from the other end thereof after passing therethrough in the space between said grip and said support.

References Cited by the Examiner

UNITED STATES PATENTS

| | | | |
|---|---|---|---|
| 1,700,167 | 1/1929 | Kollath | 16—116.1 |
| 2,498,328 | 2/1950 | Atkins | 219—236 |
| 2,564,974 | 8/1951 | Hipelius | 339—112 X |
| 2,831,711 | 4/1958 | Leadbetter | 285—382 X |
| 2,845,518 | 7/1958 | Teicheire | 219—26 |
| 2,870,239 | 1/1959 | Ustin | 339—258 X |
| 2,997,684 | 8/1961 | Cole | 339—110 |
| 3,048,687 | 8/1962 | Knowles | 219—26 |
| 3,121,781 | 2/1964 | Schoenwald | 219—237 |
| 3,134,884 | 5/1964 | Bean | 219—233 |

ANTHONY BARTIS, *Acting Primary Examiner.*

JOSEPH D. SEERS, RICHARD M. WOOD, *Examiners.*

W. D. MILLER, W. D. BROOKS, *Assistant Examiners.*